United States Patent
Alme et al.

(10) Patent No.: US 9,672,357 B2
(45) Date of Patent: Jun. 6, 2017

(54) SYSTEM AND METHOD TO MITIGATE MALWARE

(71) Applicant: McAfee, Inc., Santa Clara, CA (US)

(72) Inventors: Christoph Alme, Paderborn (DE); Slawa Hahn, Paderborn (DE); Stefan Finke, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/751,935

(22) Filed: Jun. 26, 2015

(65) Prior Publication Data
US 2016/0253500 A1 Sep. 1, 2016

Related U.S. Application Data

(60) Provisional application No. 62/121,129, filed on Feb. 26, 2015.

(51) Int. Cl.
| | |
|---|---|
| *G06F 11/00* | (2006.01) |
| *G06F 21/56* | (2013.01) |
| *G06F 17/30* | (2006.01) |
| *G06F 21/55* | (2013.01) |

(52) U.S. Cl.
CPC ...... *G06F 21/563* (2013.01); *G06F 17/30327* (2013.01); *G06F 21/552* (2013.01)

(58) Field of Classification Search
CPC ................................ G06F 21/50; G06F 21/55
USPC ...................................................... 726/22–25
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,103,838 B1* | 9/2006 | Krishnamurthy | ... G06F 17/2211 707/999.1 |
| 7,506,155 B1 | 3/2009 | Stewart et al. | |
| 2007/0169010 A1* | 7/2007 | Garner | ...................... G06F 8/47 717/136 |
| 2009/0083854 A1 | 3/2009 | Bozanich et al. | |
| 2009/0320133 A1 | 12/2009 | Viljoen et al. | |
| 2010/0205665 A1* | 8/2010 | Komili | .................. H04L 63/102 726/12 |
| 2011/0179484 A1 | 7/2011 | Tuvell et al. | |
| 2012/0191651 A1 | 7/2012 | Irizarry, Jr. | |
| 2014/0230006 A1* | 8/2014 | Burke | ..................... H04L 63/20 726/1 |

FOREIGN PATENT DOCUMENTS

WO  WO 2013-009713 A2   1/2013

OTHER PUBLICATIONS

International Search Report and Written Opinion in International Application No. PCT/US2016/016030, mailed on May 25, 2016, 12 pages.

\* cited by examiner

*Primary Examiner* — Anthony Brown
(74) *Attorney, Agent, or Firm* — Patent Capital Group

(57) ABSTRACT

Particular embodiments described herein provide for an electronic device that can be configured to receive script data, determine a checksum tree for the script data, compare each checksum of the checksum tree to one or more subtree checksums, and assign one or more classifications to the script data. In one example, the checksum tree is an abstract syntax tree.

25 Claims, 9 Drawing Sheets

142

// script variant a
for (i = 0; i < 1000; ++i) {
    a = "this is a key"
    abcdef (a);

144

// script variant b
for (x = 0; x < 3000; ++x) {
    b = "this is another key"
    decode (b);

SYSTEM AND METHOD TO MITIGATE MALWARE

CROSS-REFERENCE TO RELATED APPLICATION

This application claims the benefit of priority under 35 U.S.C. §119(e) to U.S. Provisional Application No. 62/121,129, entitled "SYSTEM AND METHOD TO MITIGATE MALWARE" filed in the U.S. Patent Office on Feb. 26, 2015, which is hereby incorporated by reference in its entirety.

TECHNICAL FIELD

This disclosure relates in general to the field of information security, and more particularly, to the mitigation of malware.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
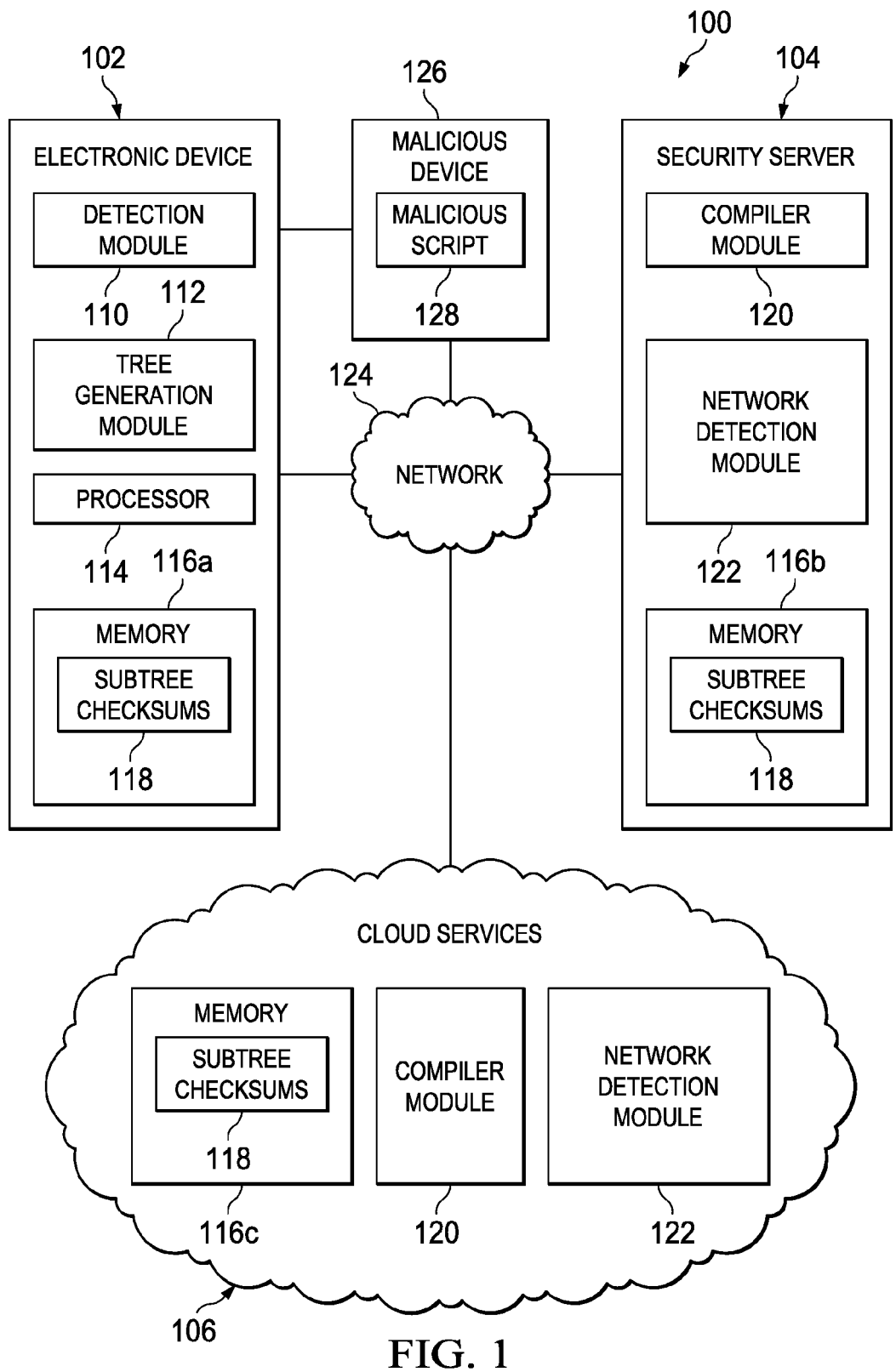
FIG. 1 is a simplified block diagram of a communication system for the mitigation of malware in a network environment in accordance with an embodiment of the present disclosure.

FIG. 1 is a simplified block diagram of a communication system 100 to mitigate malware in a network environment. Communication system 100 can include an electronic device 102, a security server 104, and cloud services 106. Electronic device 102 can include a detection module 110, a tree generation module 112, a processor 114, and memory 116a. Memory 116a can include subtree checksums 118. Security server 104 can include memory 116b, a compiler module 120, and a network detection module 122. Memory 116b can include subtree checksums 118. Cloud services 106 can include memory 116c, compiler module 120, and network detection module 122. Memory 116c can include subtree checksums 118. A malicious device 126 may attempt to introduce malware to electronic device 102. The malware may be in the form of malicious script 128. Electronic device 102, malicious device 126, security server 104, and cloud services 106 can be connected through network 124. In one example, malicious device 126 may be physically connected to electronic device 102 (e.g., through a Universal Serial Bus (USB) type connection).

In example embodiments, communication system 100 can be configured to combat known malware threats and new malware variant threats (e.g., malicious script 128) from malicious device 126 by using machine-learning training to generate classification intelligence in the form of one or more checksum trees or abstract syntax trees (AST). Using compiler module 120, communication system 100 can determine a series of fuzzy checksums (e.g., subtree checksums 118) per file (both malicious and safe) and track the overall prevalence of the checksums on a checksum tree (e.g., an AST created from script data). Tree generation module 112 can create the checksum tree for a script such as malicious script 128. At runtime, using detection module 110, the checksum tree can be interpreted and compared to checksums such as subtree checksums 118. Any node or leaf of a checksum tree that matches a checksum in subtree checksum 118 can be remembered and assigned a classification. Detection module 110 can be configured to perform a statistical voting across the individual classifications that have occurred (e.g., identifying a series of occurred matches such as a 90% probability the file includes JS.Exploit.D, an 80% probability the file includes JS.Exploit.Blacole.B, a 70% probability the file includes JS.ExploitIFrame.A, etc.).

If the overall detection probability is below a configurable threshold (e.g., below 90%), then detection module 110 can calculate a more detailed checksum tree from the script data, serialize the checksum tree into a feature vector, and transmit the feature vector to security server 104 or cloud services 106 where a more extensive classification checksum tree can be created in network detection module 122 and a more accurate classification decision of the script can occur. The term "feature vector" is to include a fixed-size list of attributes, such as the checksums per script. Detection module 110, compiler module 120, and network detection module 122 can be distributed across an on premise system or network scanners (that requiring high scan performance and reasonably low memory footprint) and cloud services that can rely on more extensive and dedicated hardware to host significantly larger classification data. The supply of script data in the feature vector to network detection module 122 allows compiler module 120 to dynamically tune and re-train the detection module 110 and network detection module 122 in regular intervals. Data privacy is supported as only a vector of non-reversible fuzzy checksums is submitted to cloud services 106 and security server 104 and neither the original file, nor any substring of it, nor its source URL need to be submitted.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Increased access to the Internet has had the unintended effect of increasing the reach of software programs that capture personal information of users without their informed consent or that corrupt computers without the user's knowledge and informed consent. The term malware as used herein includes any type of software programs designed to infiltrate, modify, change, corrupt, or damage a computer system without the owner's informed consent, regardless of the motivation for the software program, and regardless of the results caused by the software program on the owner's devices, systems, networks, or data.

Security systems are often used to attempt to detect the presence of malware. In some instances, the security systems typically rely on detecting a signature in a file being examined to determine if the file is or contains malware. In some instances, a security system may use a checksum based method to determine whether a file is malware. However, malware authors frequently change parts of the malware file in order to avoid detection by signature or checksum methods. New variants of known malware may be created by re-packing or compiling within short time intervals in order to evade signature or checksum based detection and to take advantage of the delay in creating and distributing updated detection signatures or checksums. Various security systems try to counteract the increased amount of new malware variants and samples by using more generic and more heuristic detections. However, generic detections bear the deficiency of requiring manual analysis of one or, in most cases at least two, malware variant(s) in order to provide appropriate detection. Further, heuristic detections bear the deficiency of false positives.

In addition, various security systems often rely on the use of software emulation. For example, in order to determine whether a script contains potentially dangerous behaviors, a respective malware scanner can simulate the execution of the script in question within a safe, virtual, emulation environment. This process can monitor what effects the executed script has on the emulation environment. For example, malicious Java Script is often obfuscated and only through emulation is the outer obfuscation shell of the script removed to reveal the malicious content.

In order to simulate an environment such as a web browser, a system needs to simulate the functions that the web browser exposes to script code that runs in the environment. Currently, this is done manually by malware researchers, (e.g., whenever some known malware makes calls to certain functions, the researcher who develops detection for that malware family makes sure the emulation environment simulates that function). In addition to the correct emulation of functions, anti-emulation tricks and different variations of malware implementations must be accounted for, (e.g., automatically generated script content by exploit tool kits slightly alter the code by using random variable names, using different de-obfuscation keys or change the process flow, etc.).

The current approach of manually authoring the simulation of functions is reactive, error-prone, and expensive. In addition, the full emulation of script contents comes with high performance costs. What is needed is a system and method that uses checksums based on generalized syntax representations, such as ASTs, to implement pro-active protection from new, zero-day malware variants without the sole reliance on emulation. It would be beneficial if regenerated or restructured variants of malware families, or new malware that reuses components from previous malware families, could be detected in a generic fashion.

A communication system for mitigating malware, as outlined in FIG. 1, can resolve these issues (and others). In communication system 100 of FIG. 1, to combat malware threats and new malware variants threats from malicious device 126, the system can generate one or more normalized ASTs for script content and compute checksums for specified sub trees of the generated ASTs. The normalized ASTs do not include script specific content like variable or function names and therefore the script specific content does not influence the checksum calculation. Using this approach, the system is able to detect malware based solely on its structure and avoid full emulation, anti-emulation tricks, and negative performance impact. The system can use machine-learning training in the backend to generate the required classification intelligence. The system can determine a series of checksums for specified sub trees per AST and track the overall prevalence on a complete malware training set, vs. the prevalence on a clean training set. The system can then create a database (e.g., subtree checksums 118) of the most prevalent checksums for each specified sub tree. The accuracy of the checksums and analysis can be improved by specifying additional subtree "root" nodes for which checksums should be computed (e.g., for, function, if, etc.). At runtime, the system can generate and traverse the AST for the script in question, compute checksums at respective AST sub trees, and compare the checksums against checksums stored within a database. Respective AST subtrees may depend on the trained database (e.g., subtrees arranged beneath a loop or a function call node). Each checksum can be associated with a Bayesian score and for each checksum match, the associated Bayesian score can be added to the overall malware probability.

The system can provide proactive protection by using a series of checksums that identify the closest relationships of a new unknown malware to existing known malware variants and components. For example, a checksum computed on malware variant M1 is likely to match a checksum computed on descendant malware variant M2 even if the malware variant M1 has been extended with new code, code removed/changed or regenerated (e.g., if created by an exploit tool kit).

The ratio between detection rate and false-positive rate can be configured as desired, simply based on the number of checksums required to match on an analyzed script. For example, an aggressive detection could assign higher individual Bayesian scores to each checksum so that less checksums need to match to get the sample detected, while a more accurate detection could assign lower scores to each checksum, requiring more matched checksums for a detection. Furthermore, the associated Bayesian score can be defined for each checksum individually to lower or raise the influence of the specific checksum on the overall detection probability.

In some previous system, a simulation environment has to be constantly extended to be able to emulate the most up-to-date scripts. Every new or changed function provided by the script language itself or by a web browser needs to be added or adjusted in the simulation environment. The current system can be independent of specific function implementations as the system analyzes the structure of the script content. The classification content can be trained automatically through machine learning and thus can be relatively easy to maintain.

The classification for the system solely depends on the checksums computed for the AST and the corresponding Bayesian scores. As a result, the in- and on-memory footprint can be kept very low. In addition, the in-and-on-memory footprint can be simply scaled by defining less node types to calculate checksums without changing the detection algorithm. The impact of an AST generation and the computation and comparison of checksums at specified nodes in the AST on the overall performance is much more marginal than the whole emulation of a script. As for the memory footprint, the performance ratio can be scalable by altering the number of checksums per AST. Further, depending on the matched checksums, the system can allow for the delivery of a list of malware family relationships, each with a relationship likelihood. That is, rather than just returning a single detection name, the system can return a list of relationship likelihoods (e.g., JS.Exploit.D":90%, JS.Exploit.Blacole.B":80%, JS.ExploitIFrame.A":70%).

In addition, the classification data can be generated completely through data mining and machine-learning techniques, based on reasonably sized (100,000+) malware and benign file sample sets with no need for manual rule authoring. The system can use a training set of both known malicious, and known benign, script samples in the backend to generate the required classification intelligence. In one example, for each sample, the system may generate a normalized AST, determines a series of checksums over specified subtrees of the AST, and track the overall prevalence of any checksum on a complete training set. The produced data base should reflect those checksums that have been proven to be most prevalent in the malware set solely.

At runtime the system can generate a normalized AST representation for the script in question. A detection module (e.g., detection module 110) can traverse the tree and compute the checksums for specified subtrees. The algorithm reuses already calculated checksums of lower subtrees for subtrees located in higher levels of the tree to avoid re-computation. These checksums are then compared against the entries in the trained database (subtree checksums 118). If a checksum matches an entry, the Bayesian score of this entry is added to the overall malware probability.

This process allows for the creation of checksum trees of fuzzy checksums to implement pro-active protection from new malware variants (or "zero-day" malware variants). Re-compiled or repackaged variants of malware families, or new malware that reuses components from previous malware families, can be detected in a generic fashion, protecting users, including first victims or "patient zero's" of the malware that would have been sacrificed in traditional reactive approaches. Communication system 100 can be configured to help mitigate malware by using fuzzy checksums in a checksum tree to detect new or "zero-day" malware. "Fuzzy" means the checksum does not just match the same portion of data from which it was originally computed but it also matches on close relatives having a low or relatively low edit-distance. As such, the process can be more accurate and more file format agnostic than previous methods where the transformation of code removes too much information and/or requires deep disassembly, emulation, and understanding of the malware. The malware detection can be scalable with respect to various aspects such as the detection rate vs. false rate vs. memory footprint vs. scan performance ratio and each aspect can be controlled at run time without algorithmic changes by altering the number of checksums used per file, the allowed position deviation in the checksum comparison, and the percentage or score (e.g., Bayesian score or some other similar type score) assigned per checksum match. The malware detection can include a series of fuzzy checksums that identify the closest relationships of a new unknown malware to existing known malware variants and components. As a result, a checksum computed on malware variant M1, is still likely to match on descendant M2 even if malware variant M1 is extended with new code, code is removed, recompiled or repackaged, etc.

The detection of the malware can work in a staged manner across multiple systems, such as performing a first "down-selection" on a locally installed "on premise" network scanner, and then, upon initial matching, off load the detailed classification to connected cloud services or a server as a feature vector. Due to the fixed size of the feature vector, a detection module can relatively easily compute the feature vector needed for a thorough analysis by a network detection module in cloud services (or a security server). The detection module can send the feature vector to the cloud services (or the security server), and the checksums in the feature vector can be compared against a bigger checksum tree located in the cloud services (or the security server). This allows the system to keep the data foot print on local devices (e.g., electronic device 102) small without having to sacrifice accuracy. The ratio between detection rate and false-positive rate can be configured as desired, based on the size of the series of checksums required to detect malware. For example, an aggressive detection could require only four (4) checksums to match per script, while a more accurate detection could require thirty-two (32) checksums to match and so on.

In addition, the amount of CPU cycles needed to calculate and compare a checksum is relative to the size of the AST subtree. The size of the classification data base does not have much impact on performance (except for a very small I/O related fraction). The process can provide O(log n) performance characteristics, while traditional full file hash-based detection lists have O(n+log m) performance characteristics (e.g., file size*list size). The term "O(log n)" means the performance depends slightly on the size of the scanned file (in particular, on the complexity of the script encoded in that file). The performance always stays more or less the same, with the file size having a slight, indirect impact on performance. The term "O(n+log m)" means the performance depends on both the size of the scanned file (n representing file size) and the size of the tree, which is log m. The term "m" representing the total amount of nodes in the tree and the lookup performance is a logarithm of m because it is stored as a sorted tree (e.g., "red-black" binary tree) and not as a sequential list.

Also, the system can allow for delivery of a list of family relationships, each with a relationship likelihood. That is, rather than just returning a single detection name, the system can return a list such as "JS.Exploit.D":90%, JS.Exploit-.Blacole.B":80%, and JS.ExploitIFrame.A":70%. In an example, to determine the percentages, probability values for each matching node in a checksum tree can be stored. The probability value can be derived from the prevalence of a checksum in the malware and benign file training sets as compared to clean training sets. Further, the classification data can be generated completely through data mining and machine-learning techniques, based on reasonably sized (100,000+) malware and benign file sample sets. Thus, there is no need for manual rule authoring.

Communication system 100 can be configured to use a training set of both known malicious and known benign file samples to generate the classification intelligence of a checksum tree. From each sample, communication system 100 can determine a series of fuzzy checksums and track the overall prevalence of any checksum on a complete training set. Using the training set, communication system 100 can then produce a checksum tree that reflects a series of those checksums that have been proven to be most prevalent in the malware set and benign file set.

At runtime, communication system 100 can be configured to interpret the checksum tree such that it descends from the root node(s) and for each node in the checksum tree, compares the checksum to the checksum stored with the checksum tree node. The leaf nodes (or at least a majority of the leaf nodes) in the checksum tree have a class label or classification assigned. The assigned classification specifies the most likely malware family name (e.g., JS.Exploit.D) or benign label (e.g., CLEAN) and can assign a match likelihood (e.g., 0 . . . 100%) based on the node or nodes that match the AST subtree checksum and how well the checksum matches the node. Any classification that is reached through matching nodes is remembered and a voting across the individual classifications is performed to come up with the most likely classification. In one example, a probability sum is created using a weighted combination of the individual detections. More specifically, a Random Forest classifier may be used with Bayesian voting across the matching classification nodes.

Turning to the infrastructure of FIG. 1, communication system 100 in accordance with an example embodiment is shown. Generally, communication system 100 can be implemented in any type or topology of networks. Network 124 represents a series of points or nodes of interconnected communication paths for receiving and transmitting packets of information that propagate through communication system 100. Network 124 offers a communicative interface between nodes and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, security server 104, and cloud services 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Cloud services 106 is generally defined as the use of computing resources that are delivered as a service over a network, such as the Internet. Typically, compute, storage, and network resources are offered in a cloud infrastructure, effectively shifting the workload from a local network to the cloud network.

In regards to the internal structure associated with communication system 100, each of electronic device 102, security server 104, and cloud services 106 can include memory elements for storing information to be used in the operations outlined herein. Each of electronic device 102, security server 104, and cloud services 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, security server 104, and/or cloud services 106, may include software modules (e.g., detection module 110, compiler module 120, and/or network detection module 122) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, security server 104, and cloud services 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Security server 104 can be a network element such as a server or virtual server and can be associated with clients, customers, endpoints, or end users wishing to initiate a communication in communication system 100 via some network (e.g., network 124). The term 'server' is inclusive of devices used to serve the requests of clients and/or perform some computational task on behalf of clients within communication system 100. Although detection module 110, compiler module 120 and network detection module 122 are represented in FIG. 1 as separate modules, this is for illustrative purposes only. These modules could be combined or separated in any suitable configuration. Furthermore, these modules could be integrated with or distributed in cloud services 106 or security server 104 or in another network accessible by electronic device 102.

Figures 2, 3, 4:
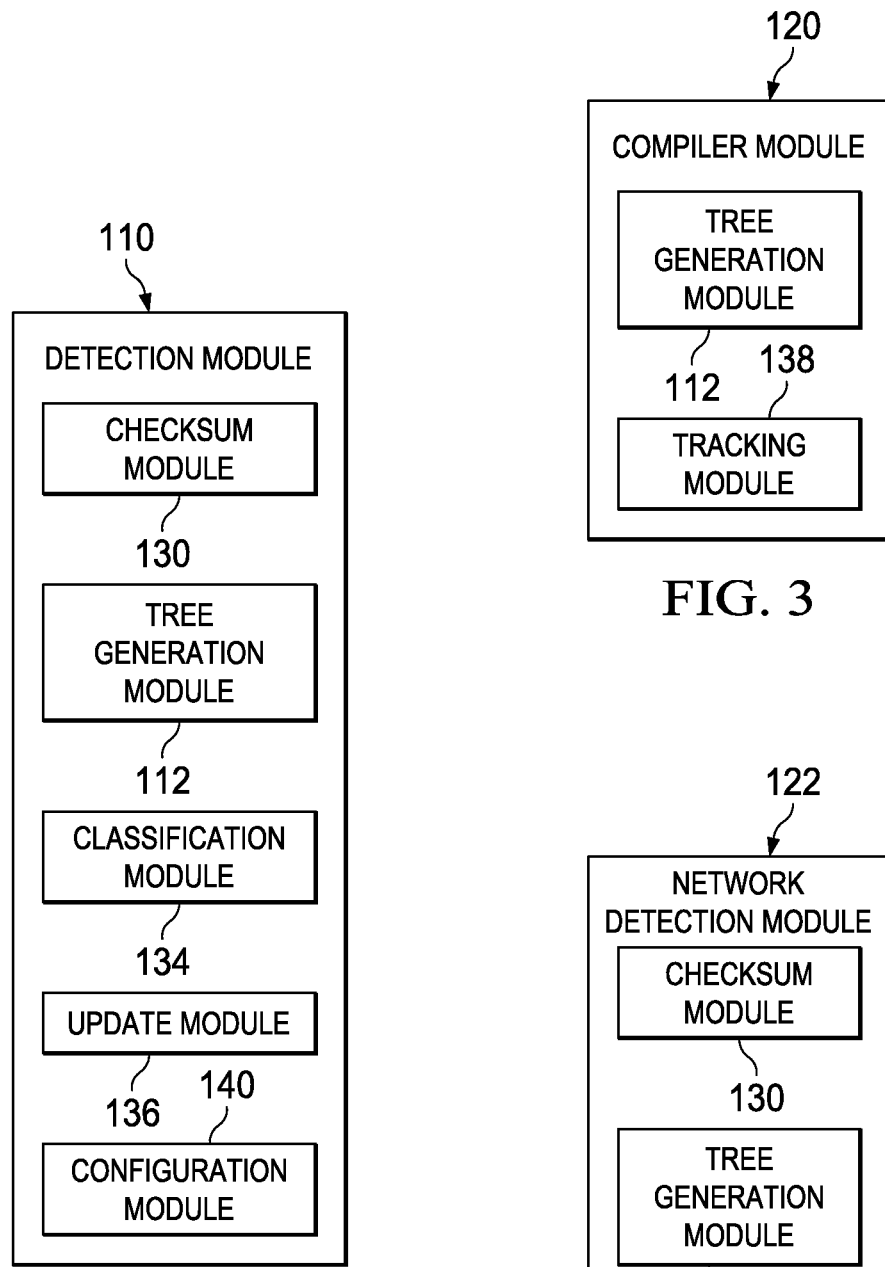
FIG. 2 is a simplified block diagram of a detection module in a network environment in accordance with an embodiment of the present disclosure.
FIG. 3 is a simplified block diagram of a compiler module in a network environment in accordance with an embodiment of the present disclosure.
FIG. 4 is a simplified block diagram of a network detection module in a network environment in accordance with an embodiment of the present disclosure.

Turning to FIG. 2, FIG. 2 illustrates one example of detection module 110. Detection module 110 can include a checksum module 130, a tree generation module 132, a classification module 134, update module 136, and a configuration module 140. Checksum module 130 can be configured as a checksum calculator and comparator. Checksum module 130 may use a series of fuzzy checksums, to identify benign files, existing malware, and new unknown malware. A checksum computed on malware variant M1, is still likely to match on descendant M2 even if the variant malware has been extended with new code, code removed, recompiled or repackaged.

Tree generation module 132 can be configured to generate a checksum tree from script data. Each node in the checksum tree can reflect the logic in the script data that has been proven to be most prevalent in either benign files, or known malware files. In an example, tree generation module 132 can be configured to generate an AST.

Classification module 134 can be configured as a classification queue and voter. Classification module 134 can create a list of family relationships, each with a relationship likelihood. That is, rather than just returning a single detection name (e.g., JS.Exploit.D), classification module 134 can return a list such as JS.Exploit.D:90%, JS.Exploit.Blacole.B:80%, JS.ExploitIFrame.A:70%, etc. The classification data can be generated completely through data mining and machine-learning techniques using existing known malware and benign script variants and components. The existing known malware and benign script variants and components may be reasonably sized (100,000+) malware and benign file sample sets. There is no need for manual rule authoring.

Update module 136 can be configured to receive updated versions of generated checksum trees for storage in subtree checksums 118. Security server 104 or cloud services 106 can be operable to, at certain intervals or as new checksum trees are generated, to update subtree checksums 118 with new checksum trees. In various embodiments, update module 136 controls the updating of subtree checksums 118 with new checksum subtrees from compiler module 120 in security server 104 or in cloud services 106.

Configuration module 140 can be configured to change the ratio between the detection rate and the false-positive rate as desired. The ratio can be based on the size of the series of checksums required to match on a file. For example, an aggressive detection could require only 4 checksums to match per file, while a more accurate detection could require 32 checksums to match and so on. The amount of CPU cycles needed to calculate and compare a checksum is relative to the size of the AST subtree. Neither the size of the script nor the size of the classification data base (e.g., subtree checksums 118) will impact the performance, except for a small I/O related fraction. This offers one advantage in that O(log n) performance characteristics can be provided, while traditional full file hash-based detection lists have O(n+log m) performance characteristics (file size*list size).

Turning to FIG. 3, FIG. 3 illustrates one example of compiler module 120. Compiler module 120 can include tree generation module 132 and a tracking module 138. Tracking module 138 can be configured to track known and new malware as well as benign files. Tracking module 138 can also send a request to tree generation module 132 for a new checksum tree to be generated for new malware and new benign files.

Turning to FIG. 4, FIG. 4 illustrates one example of network detection module 122. Network detection module 122 can include checksum module 130, tree generation module 112, and classification module 134. Network detection module 122 can perform a more detailed analysis on script data.

Figures 5A, 5B, 5C:
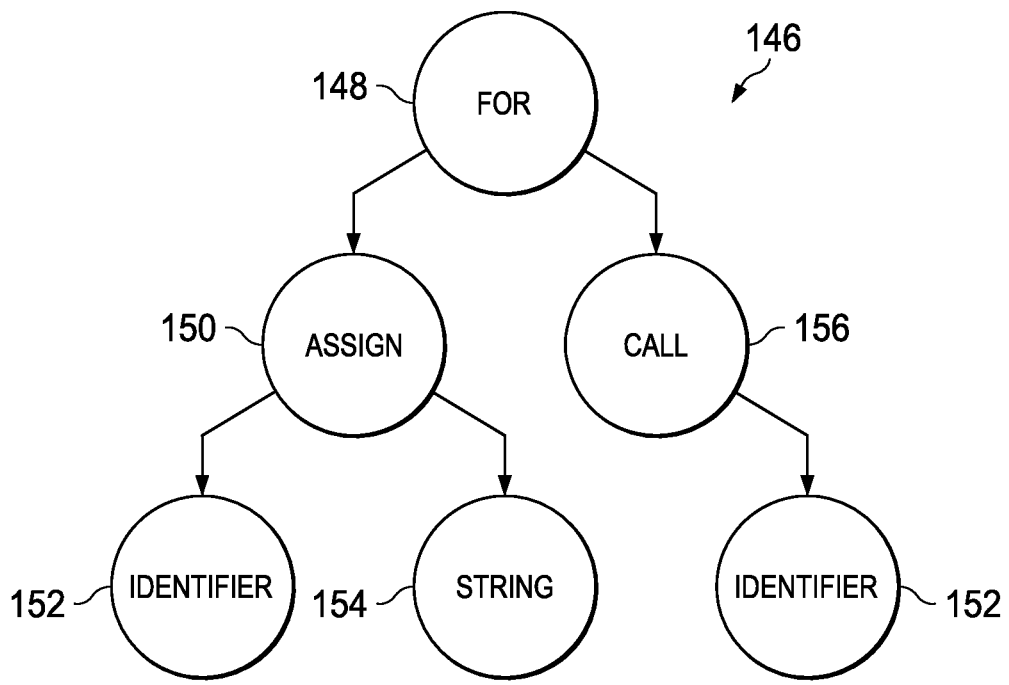
FIG. 5A is a simplified block diagram of a script in accordance with an embodiment of the present disclosure.
FIG. 5B is a simplified block diagram of another script in accordance with an embodiment of the present disclosure.
FIG. 5C is a simplified block diagram of an abstract syntax tree in accordance with an embodiment of the present disclosure.

Turning to FIGS. 5A-5C, FIG. 5A illustrates a script variant A 142, FIG. 5B illustrates a script variant B 144, and FIG. 5C illustrates an AST 146 that represents both script variant A 142 and script variant B 144. For example, a FOR node 148 of AST 146 can represent the "for" code in line two of script variant A 142 and script variant B 144.

An ASSIGN node 150 can represent the "=" sign in line three of script variant A 142 and script variant B 144, which represent assignment of a right-side constant, or expression, to a left-side variable. An IDENTIFIER node 152 can represent the identifier "a" in line three of script variant A 142 and the identifier "b" in line three of script variant B 144. A STRING node 154 can represent the string literal "this is a key" in line three of script variant A 142 and the string literal "this is another key" in line three of script variant B 144. In this example, ASSIGN node 150, IDENTIFIER node 152, and STRING node 157 of AST 146 can represent line three in script variant A 142 and script variant B 144, even though each line is somewhat different.

Similarly, a CALL node 156 can represent the call to function "abcdef" in line four of script variant A 142 and the call to function "decode" in line four of script variant B 144. An IDENTIFIER node 152 can represent the identifier "a" used in the function call in line four of script variant A 142 and the identifier "b" used in the function call in line four of script variant B 144. By using one normalized AST (e.g., AST 146) to represent both script variant A 142 and script variant B 144, the normalized AST does not include script specific content like actual variable- or function names, nor constant values (like string literals), and therefore the script specific content does not influence the checksum calculation. Using this approach, the system is able to detect malware based solely on its structure and avoid full emulation, anti-emulation tricks, and negative performance impact.

Figure 6:
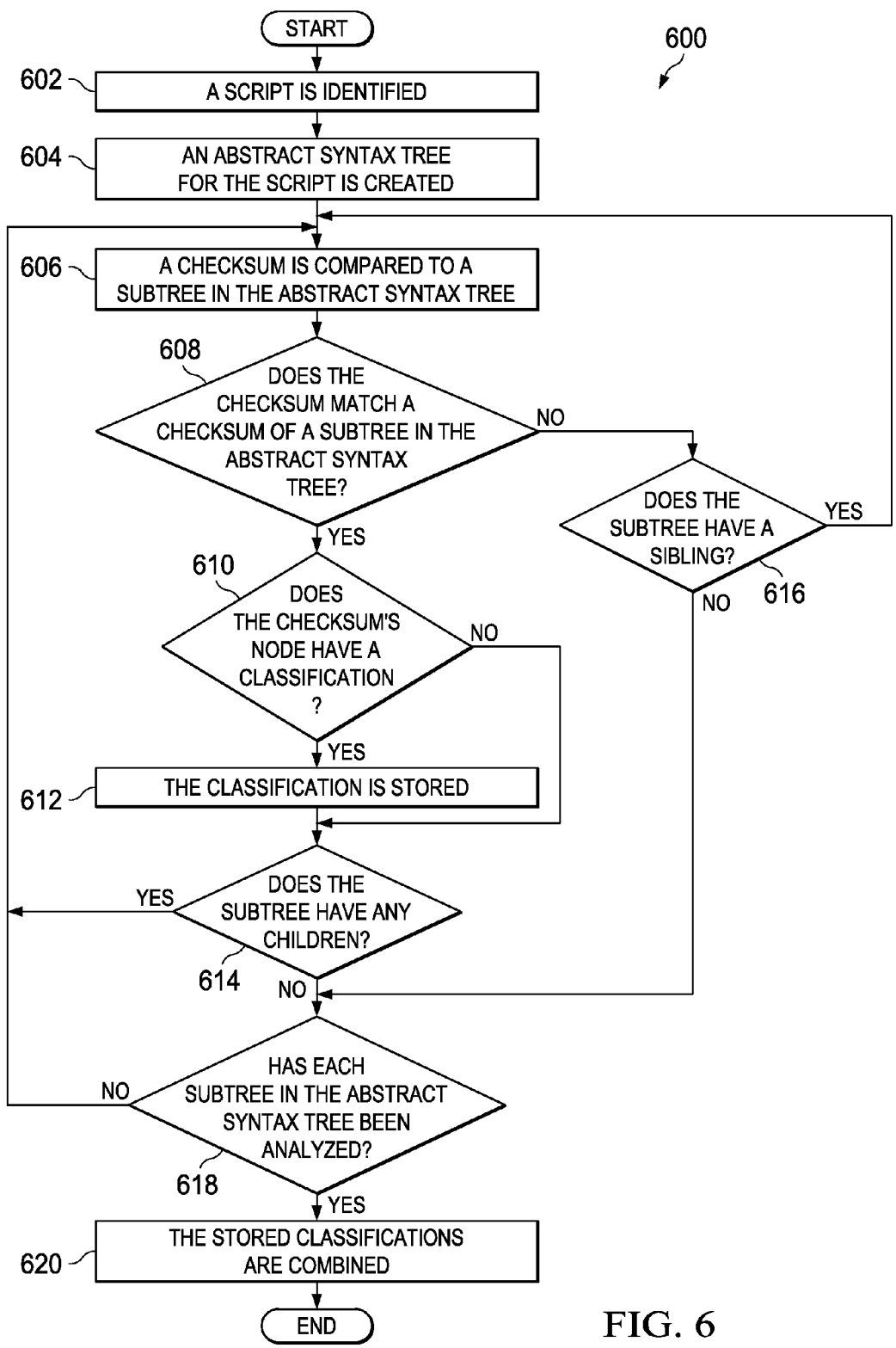
FIG. 6 is a simplified flowchart illustrating potential operations that may be associated with an embodiment of the present disclosure.

Turning to FIG. 6, FIG. 6 is an example flowchart illustrating possible operations of a flow 600 that may be associated with mitigation against malware, in accordance with an embodiment. In an embodiment, one or more operations of flow 600 may be performed by detection module 110 and tree generation module 112. At 602 a script is identified. At 604, an AST for the script is created. At 606, a checksum is compared to a subtree in the AST. For example, one or more checksums from subtree checksums 118 may be compared to a subtree in AST 146. At 608, the system determines if the checksum matches a checksum of a subtree in the AST.

If the checksum does match the checksum of the checksum tree, then the system determines if the checksum's node has a classification, as in 610. If the node of the checksum does not have a classification, then the system determines if the subtree has any children, as in 614. If the node of the checksum does have a classification, then the classification is stored, as in 612, and the system determines if the subtree has any children, as in 614. If the subtree does have children, then the system goes back to 606 and a checksum is compared to another subtree in the AST. If the subtree does not have any children, then the system determines if each subtree in the AST has been analyzed, as in 618. This ensures that all of the subtrees of the AST are analyzed. For example, AST 146 may include 2, 5, 10 or any number of subtrees. If each subtree in the AST has been analyzed, then the stored classifications (if any) are combined, as in 620. If each subtree in the AST has not been analyzed, then they system goes back to 606 and a checksum is compared to a (new) subtree in the AST.

Going back to 608, if the checksum does not match a checksum of the subtree in the AST, then the system determines if the subtree has a sibling, as in 616. For example, as illustrated in FIG. 5C, ASSIGN node 150, IDENTIFIER node 152, and STRING node 154 may be a subtree and a sibling to CALL node 156 and IDENTIFIER node 152, which is another subtree. It is possible to have many siblings under a root node as well as any other node in the checksum tree and this ensures that each sibling is analyzed. If the subtree does have a sibling, then a checksum is compared to a subtree (sibling subtree) in the AST. If the subtree does not have a sibling, then the system determines if each subtree of the AST has been analyzed, as in 618.

Figure 7:
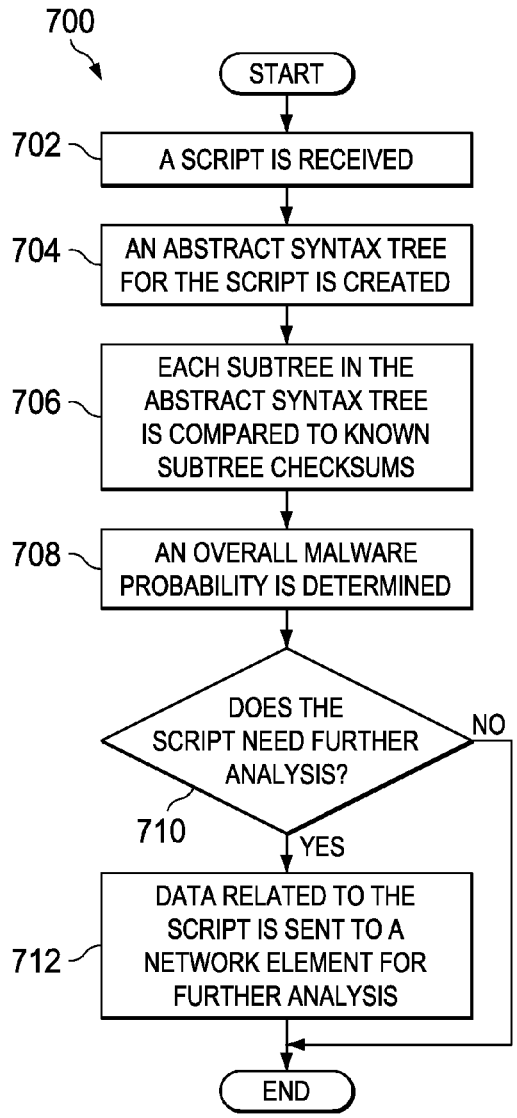
FIG. 7 is a simplified flowchart illustrating potential operations that may be associated with an embodiment of the present disclosure.

Turning to FIG. 7, FIG. 7 is an example flowchart illustrating possible operations of a flow 700 that may be associated with mitigation against malware, in accordance with an embodiment. In an embodiment, one or more operations of flow 700 may be performed by detection module 110 and tree generation module 112. At 702 a script is received. At 704, an AST for the script is created. At 706, each subtree in the AST is compared to known subtree checksums. At 708, an overall malware probability is determined. For example, detection module 110 may determine an overall malware probability of the script. At 710, the system determines if the script needs further analysis. If the script does need further analysis, then data related to the script is sent to a network element for further analysis, as in 712. For example, if the classification of the script has less than a 90% probability that the script is malicious (or benign), then a feature vector may be sent to security server 104 or cloud services 106 for further analysis using network detection module 122. If the script does not need further analysis, then the process ends. For example, if the classification of the script has an over 90% likelihood the script includes malware, then it is very likely (e.g., over a 90% probability) that the script contains malware and no further analysis is needed.

Figure 8:
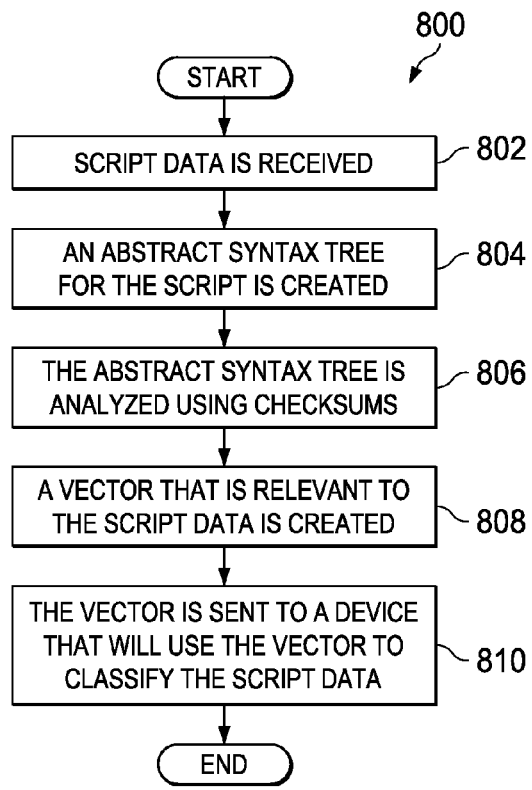
FIG. 8 is a simplified flowchart illustrating potential operations that may be associated with an embodiment of the present disclosure.

Turning to FIG. 8, FIG. 8 is an example flowchart illustrating possible operations of a flow 800 that may be associated with mitigation against malware, in accordance with an embodiment. In an embodiment, one or more operations of flow 800 may be performed by detection module 110 and tree generation module 112. At 802, script data is received. At 804, an AST for the script is created. At 806, the AST is analyzed using checksums. For example, the AST may be analyzed using subtree checksums 118. At 808, based on the analysis of the AST, a vector that is relevant to the script data is created. At 810, the vector is sent to a device that will use the vector to classify the script data.

Figure 9:
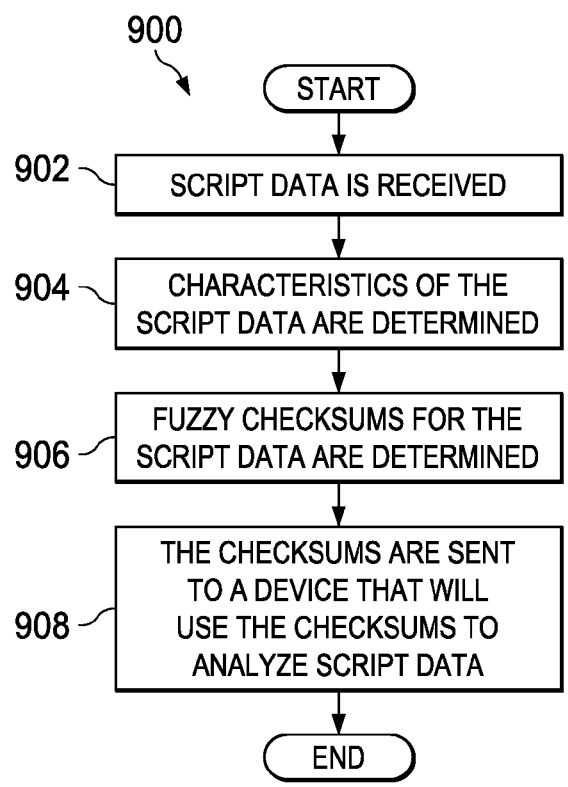
FIG. 9 is a simplified flowchart illustrating potential operations that may be associated with an embodiment of the present disclosure.

Turning to FIG. 9, FIG. 9 is an example flowchart illustrating possible operations of a flow 900 that may be associated with mitigation against malware, in accordance with an embodiment. In an embodiment, one or more operations of flow 900 may be performed by detection module 110 and tree generation module 112. At 902, script data is received. The script data may be related to new malware or a new benign file. At 904, characteristics of the script are determined. At 906, fuzzy checksums for the script are determined. At 908, the checksums are sent to a device that will use the checksums to analyze script data. For example, compiler module 120 may generate and communicate subtree checksums 118 to update module 136 in detection module 110.

Figure 10:
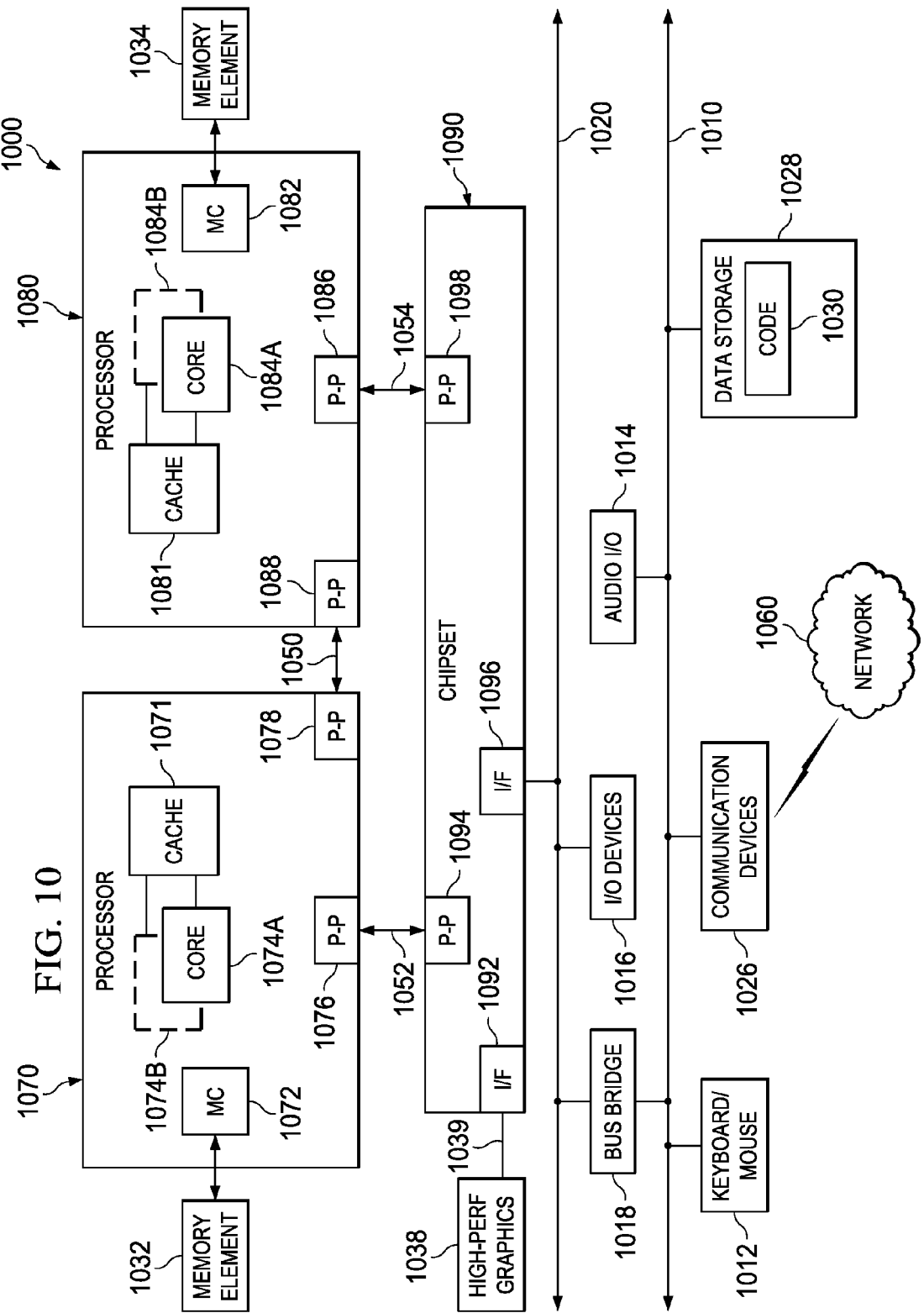
FIG. 10 is a block diagram illustrating an example computing system that is arranged in a point-to-point configuration in accordance with an embodiment.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the network elements of communication system 100 may be configured in the same or similar manner as computing system 1000.

As illustrated in FIG. 10, system 1000 may include several processors, of which only two, processors 1070 and 1080, are shown for clarity. While two processors 1070 and 1080 are shown, it is to be understood that an embodiment of system 1000 may also include only one such processor. Processors 1070 and 1080 may each include a set of cores (i.e., processor cores 1074A and 1074B and processor cores 1084A and 1084B) to execute multiple threads of a program. The cores may be configured to execute instruction code in a manner similar to that discussed above with reference to FIGS. 6-9. Each processor 1070, 1080 may include at least one shared cache 1071, 1081. Shared caches 1071, 1081 may store data (e.g., instructions) that are utilized by one or more components of processors 1070, 1080, such as processor cores 1074 and 1084.

Processors 1070 and 1080 may also each include integrated memory controller logic (MC) 1072 and 1082 to communicate with memory elements 1032 and 1034. Memory elements 1032 and/or 1034 may store various data used by processors 1070 and 1080. In alternative embodiments, memory controller logic 1072 and 1082 may be discrete logic separate from processors 1070 and 1080.

Processors 1070 and 1080 may be any type of processor and may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a high-performance graphics circuit 1038 via a high-performance graphics interface 1039, using an interface circuit 1092, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a keyboard/mouse 1012 (or other input devices such as a touch screen, trackball, etc.), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 11:
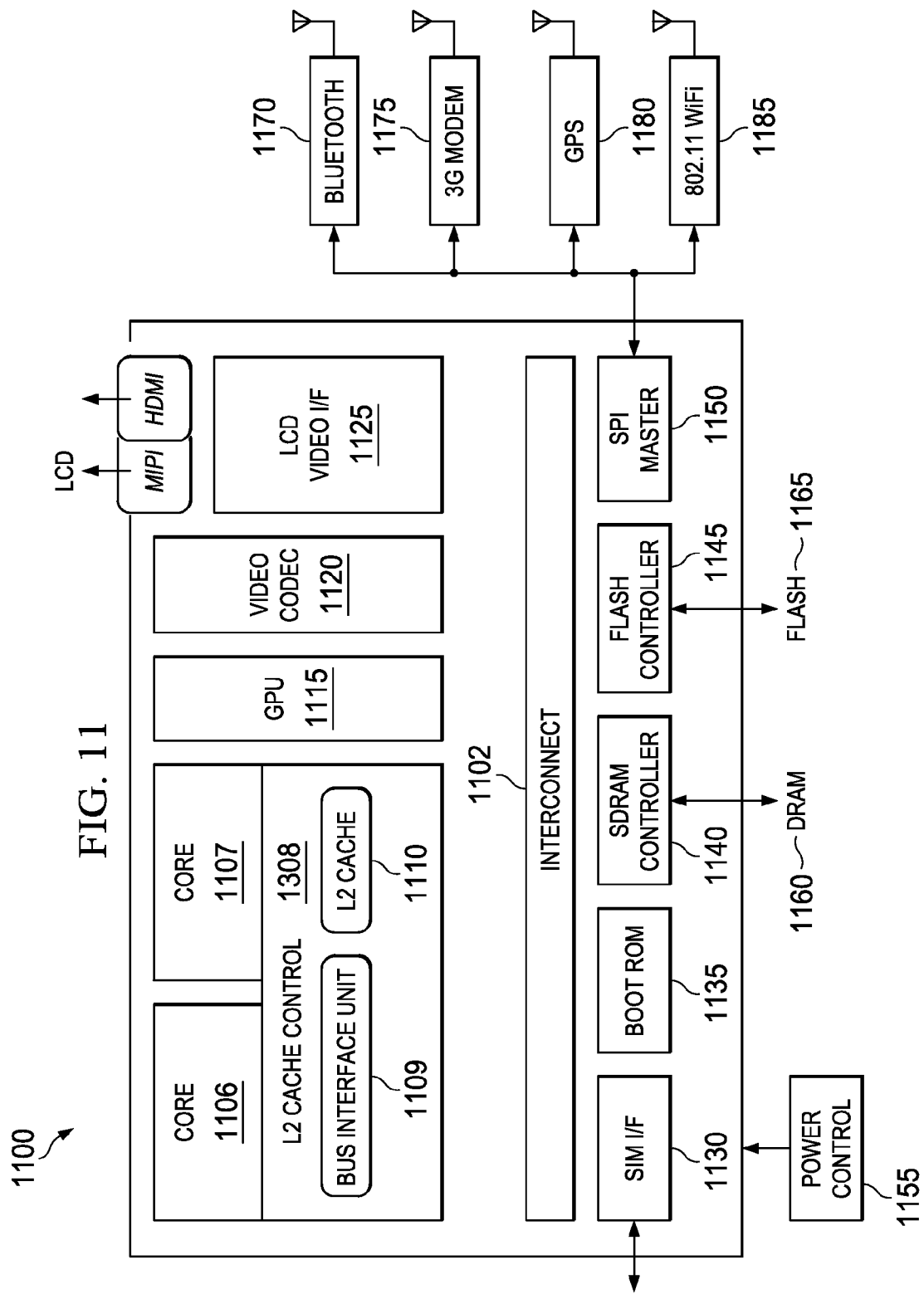
FIG. 11 is a simplified block diagram associated with an example ARM ecosystem system on chip (SOC) of the present disclosure.

Turning to FIG. 11, FIG. 11 is a simplified block diagram associated with an example ARM ecosystem SOC 1100 of the present disclosure. At least one example implementation of the present disclosure can include the mitigation of malware features discussed herein and an ARM component. For example, the example of FIG. 11 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 11, ARM ecosystem SOC 1100 may include multiple cores 1106-1107, an L2 cache control 1108, a bus interface unit 1109, an L2 cache 1110, a graphics processing unit (GPU) 1115, an interconnect 1102, a video codec 1120, and a liquid crystal display (LCD) I/F 1125, which may be associated with mobile industry processor interface (MIPI)/high-definition multimedia interface (HDMI) links that couple to an LCD.

ARM ecosystem SOC 1100 may also include a subscriber identity module (SIM) I/F 1130, a boot read-only memory (ROM) 1135, a synchronous dynamic random access memory (SDRAM) controller 1140, a flash controller 1145, a serial peripheral interface (SPI) master 1150, a suitable power control 1155, a dynamic RAM (DRAM) 1160, and flash 1165. In addition, one or more example embodiment include one or more communication capabilities, interfaces, and features such as instances of Bluetooth™ 1170, a 3G modem 1175, a global positioning system (GPS) 1180, and an 802.11 Wi-Fi 1185.

In operation, the example of FIG. 11 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 12:
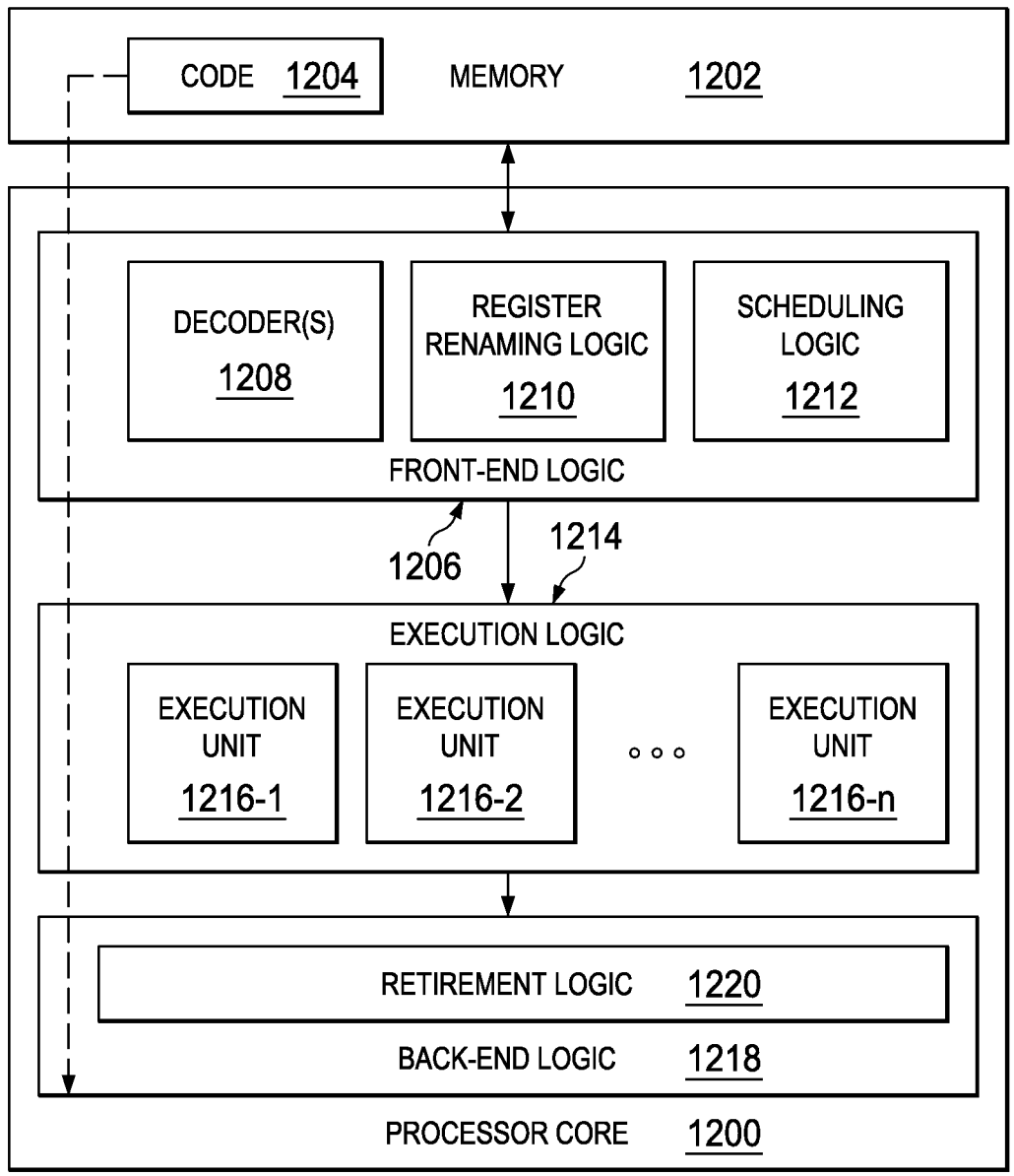
FIG. 12 is a block diagram illustrating an example processor core in accordance with an embodiment.

FIG. 12 illustrates a processor core 1200 according to an embodiment. Processor core 1200 may be the core for any type of processor, such as a micro-processor, an embedded processor, a digital signal processor (DSP), a network processor, or other device to execute code. Although only one processor core 1200 is illustrated in FIG. 12, a processor may alternatively include more than one of the processor core 1200 illustrated in FIG. 12. For example, processor core 1200 represents one example embodiment of processors cores 1074a, 1074b, 1084a, and 1084b shown and described with reference to processors 1070 and 1080 of FIG. 10. Processor core 1200 may be a single-threaded core or, for at least one embodiment, processor core 1200 may be multi-threaded in that it may include more than one hardware thread context (or "logical processor") per core.

FIG. 12 also illustrates a memory 1202 coupled to processor core 1200 in accordance with an embodiment. Memory 1202 may be any of a wide variety of memories (including various layers of memory hierarchy) as are known or otherwise available to those of skill in the art. Memory 1202 may include code 1204, which may be one or more instructions, to be executed by processor core 1200. Processor core 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor core 1200 can also include execution logic 1214 having a set of execution units 1216-1 through 1216-N. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor core 1200 allows out of order execution but requires in order retirement of instructions. Retirement logic 1220 may take a variety of known forms (e.g., re-order buffers or the like). In this manner, processor core 1200 is transformed during execution of code 1204, at least in terms of the output generated by the decoder, hardware registers and tables utilized by register renaming logic 1210, and any registers (not shown) modified by execution logic 1214.

Although not illustrated in FIG. 12, a processor may include other elements on a chip with processor core 1200, at least some of which were shown and described herein with reference to FIG. 10. For example, as shown in FIG. 10, a processor may include memory control logic along with processor core 1200. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 6-9) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one machine readable storage medium to receive script data, determine a checksum tree for the script data, compare each checksum of the checksum tree to one or more subtree checksums, and assign one or more classifications to the script data.

In Example C2, the subject matter of Example C1 can optionally include where the checksum tree is calculated on an abstract syntax tree.

In Example C3, the subject matter of any one of Examples C1-C2 can optionally include where each checksum in the subtree checksums is a prevalent malware or benign checksum.

In Example C4, the subject matter of any one of Examples C1-C3 can optionally include where the classification is based on a subtree of the checksum tree that matches a checksum in the subtree checksums.

In Example C5, the subject matter of any one of Examples C1-C4 can optionally include where a percentage is assigned to the classification.

In Example C6, the subject matter of any one of Example C1-C5 can optionally include where one or more checksums of the checksum tree is a fuzzy checksum.

In Example C7, the subject matter of any one of Examples C1-C6 can optionally include where the instructions, when executed by the at least one processor, further cause the at least machine readable storage medium to serialize the checksum tree into a feature vector.

In Example C8, the subject matter of any one of Examples C1-C6 can optionally include where the instructions, when executed by the at least one processor, further cause the at least one processor to communicate the feature vector to a network element for further analysis.

In Example A1, an apparatus can include a tree generation module and a detection module. The tree generation module can be configured to receive script data and determine a checksum tree for the script data. The detection module can be configured to compare each checksum of the checksum tree to one or more subtree checksums and assign one or more classifications to the script data.

In Example, A2, the subject matter of Example A1 can optionally include where the checksum tree is calculated on an abstract syntax tree.

In Example A3, the subject matter of any one of Examples A1-A2 can optionally include where each checksum in the subtree checksums is a prevalent malware or benign checksum.

In Example A4, the subject matter of any one of Examples A1-A3 can optionally include where the classification is based on a subtree of the checksum tree that matches a checksum in the subtree checksums.

In Example A5, the subject matter of any one of Examples A1-A4 can optionally include where a percentage is assigned to the classification.

In Example A6, the subject matter of any one of Examples A1-A5 can optionally include where one or more checksums of the checksum tree is a fuzzy checksum.

In Example A7, the subject matter of any one of Examples A1-A6 can optionally include where the detection module is further configured to serialize the checksum tree into a feature vector.

In Example A8, the subject matter of any one of Examples A1-A6 can optionally include where the detection module is further configured to communicate the feature vector to a network element for further analysis.

Example M1 is a method including receiving script data, determining a checksum tree for the script data, comparing each checksum of the checksum tree to one or more subtree checksums, and assigning one or more classifications to the script data.

In Example M2, the subject matter of Example M1 can optionally include where the checksum tree is calculated on an abstract syntax tree.

In Example M3, the subject matter of any one of the Examples M1-M2 can optionally include where each checksum in the subtree checksums is a prevalent malware or benign checksum.

In Example M4, the subject matter of any one of the Examples M1-M3 can optionally include where the classification is based on a subtree of the checksum tree that matches a checksum in the subtree checksums.

In Example M5, the subject matter of any one of the Examples M1-M4 can optionally include where a percentage is assigned to the classification.

In Example M6, the subject matter of any one of the Examples M1-M5 can optionally include where one or more checksums of the checksum tree is a fuzzy checksum.

In Example M7, the subject matter of any one of the Examples M1-M6 can optionally include serializing the checksum tree into a feature vector and communicating the feature vector to a network element for further analysis.

Example S1 is a system for mitigating malware, the system including a tree generation module and a detection module. The tree generation module can be configured to receive script data and determine a checksum tree for the script data. The detection module can be configured to compare each checksum of the checksum tree to one or more subtree checksums and assign one or more classifications to the script data.

In Example S2, the subject matter of Example S1 can optionally include where the classification is based on a subtree of the checksum tree that matches a checksum in the subtree checksums.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer readable medium comprising one or more instructions that when executed by a processor, cause the computer readable medium to:
   receive script data;
   determine a checksum tree for the script data;
   compare each checksum of the checksum tree to one or more subtree checksums, wherein each of the one or more subtree checksums is a malware checksum or a benign checksum;
   assign one or more classifications to the script data, wherein the assigned classification includes a likely malware family name or a benign label; and
   store the assigned classifications in memory.

2. The at least one non-transitory computer readable medium of claim 1, wherein the checksum tree is calculated on an abstract syntax tree.

3. The at least one non-transitory computer readable medium of claim 1, wherein each checksum in the subtree checksums is a prevalent malware or benign checksum.

4. The at least one non-transitory computer readable medium of claim 1, wherein the classification is based on a subtree of the checksum tree that matches a checksum in the subtree checksums.

5. The at least one machine readable medium of claim 1, wherein the assigned classification that includes a likely malware family name further includes a probability value.

6. The at least one non-transitory computer readable medium of claim 1, wherein one or more checksums of the checksum tree is a fuzzy checksum.

7. The at least one non-transitory computer readable medium of claim 1, further comprising one or more instructions that when executed by the at least one processor, cause the machine readable medium to:
serialize the checksum tree into a feature vector.

8. The at least one non-transitory computer readable medium of claim 7, further comprising one or more instructions that when executed by the at least one processor, cause the machine readable medium to:
communicate the feature vector to a network element for further analysis.

9. An apparatus comprising:
a memory element;
a processor;
a tree generation module configured to:
receive script data at the processor; and
determine a checksum tree for the script data; and
a detection module configured to:
compare each checksum of the checksum tree to one or more subtree checksums stored in the memory, wherein each of the one or more subtree checksums is a malware checksum or a benign checksum; and
assign one or more classifications to the script data, wherein the assigned classification includes a likely malware family name or a benign label.

10. The apparatus of claim 9, wherein the checksum tree is calculated on an abstract syntax tree.

11. The apparatus of claim 9, wherein each checksum in the subtree checksums is a prevalent malware or benign checksum.

12. The apparatus of claim 9, wherein the classification is based on a subtree of the checksum tree that matches a checksum in the subtree checksums.

13. The apparatus of claim 9, wherein the assigned classification that includes a likely malware family name further includes a probability value.

14. The apparatus of claim 9, wherein one or more checksums of the checksum tree is a fuzzy checksum.

15. The apparatus of claim 9, wherein the detection module is further configured to:
serialize the checksum tree into a feature vector.

16. The apparatus of claim 15, wherein the detection module is further configured to:
communicate the feature vector to a network element for further analysis.

17. A method comprising:
receiving script data at a processor;
determining a checksum tree for the script data;
comparing each checksum of the checksum tree to one or more subtree checksums, wherein each of the one or more subtree checksums is a malware checksum or a benign checksum;
assigning one or more classifications to the script data, wherein the assigned classification includes a likely malware family name or a benign label; and
storing the assigned classification in memory.

18. The method of claim 17, wherein the checksum tree is calculated on an abstract syntax tree.

19. The method of claim 17, wherein each checksum in the subtree checksums is a prevalent malware or benign checksum.

20. The method of claim 17, wherein the classification is based on a subtree of the checksum tree that matches a checksum in the subtree checksums.

21. The method of claim 17, wherein the assigned classification that includes a likely malware family name further includes a probability value.

22. The method of claim 17, wherein one or more checksums of the checksum tree is a fuzzy checksum.

23. The method of claim 17, further comprising:
serializing the checksum tree into a feature vector; and
communicating the feature vector to a network element for further analysis.

24. A system for mitigating malware, the system comprising:
a memory element;
communication circuitry;
a hardware processor configured to:
receive script data;
determine a checksum tree for the script data;
compare each checksum of the checksum tree to one or more subtree checksums, wherein each of the one or more subtree checksums is a malware checksum or a benign checksum;
assign one or more classifications to the script data, wherein the assigned classification includes a likely malware family name or a benign label; and
store the assigned classifications in memory.

25. The system of claim 24, wherein the classification is based on a subtree of the checksum tree that matches a checksum in the subtree checksums.

* * * * *